(12) United States Patent
Creager

(10) Patent No.: US 12,499,461 B2
(45) Date of Patent: Dec. 16, 2025

(54) TECHNIQUES FOR GENERATING TRANSACTION FORECASTS

(71) Applicant: Truist Bank, Charlotte, NC (US)

(72) Inventor: James Harrison Creager, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 241 days.

(21) Appl. No.: 17/894,747

(22) Filed: Aug. 24, 2022

(65) Prior Publication Data

US 2024/0070696 A1 Feb. 29, 2024

(51) Int. Cl.
*G06Q 20/10* (2012.01)
*G06Q 20/36* (2012.01)
*G06Q 30/0201* (2023.01)

(52) U.S. Cl.
CPC ....... *G06Q 30/0206* (2013.01); *G06Q 20/102* (2013.01); *G06Q 20/3676* (2013.01)

(58) Field of Classification Search
CPC ............. G06Q 30/0206; G06Q 20/102; G06Q 20/3676
USPC .......................................................... 705/35
See application file for complete search history.

(56) References Cited

U.S. PATENT DOCUMENTS

| | | | | |
|---|---|---|---|---|
| 8,473,858 | B2* | 6/2013 | Buchanan | G06F 3/04847 715/784 |
| 11,295,358 | B1* | 4/2022 | Komarevtsev | G06F 9/451 |
| 11,328,366 | B2* | 5/2022 | Rephlo | G06Q 40/12 |
| 11,574,493 | B1* | 2/2023 | Sachtleben | G06Q 40/02 |
| 2012/0179604 | A1* | 7/2012 | Blain | G06Q 40/02 705/40 |
| 2013/0124376 | A1* | 5/2013 | Lefebvre | G06Q 20/306 705/34 |

* cited by examiner

*Primary Examiner* — Clifford B Madamba
(74) *Attorney, Agent, or Firm* — Killpatrick Townsend & Stockton LLP; Michael A. Springs, Esq.

(57) ABSTRACT

A method for generating a transaction forecast is provided. The method includes accessing a forecast transaction template that defines forecast animation features of the transaction forecast. The method further includes predicting a set of recurring and expected charges at a client account and detecting a triggering event of transactions at the client account, wherein the triggering event is defined in the forecast transaction template. Additionally, the method includes identifying at least one additional transaction event relevant to the transaction forecast. Further, the method includes constructing a timeline of the set of expected charges, the at least one additional transaction event, and the triggering event and generating the transaction forecast including an animation of the additional transaction events, the set of expected charges, and the triggering event in the timeline.

17 Claims, 7 Drawing Sheets

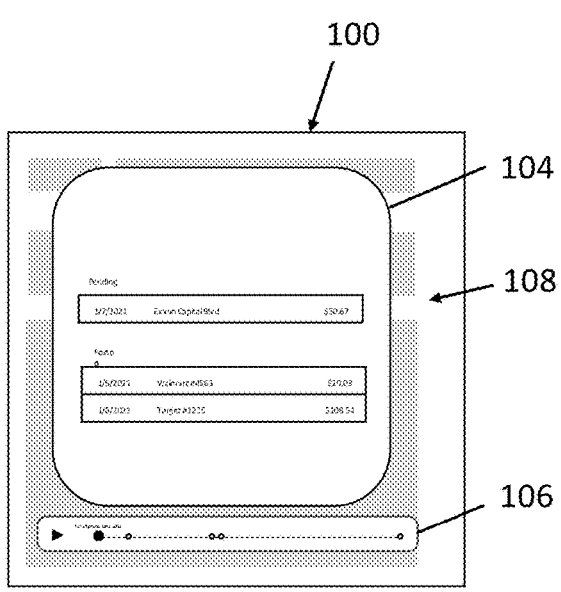
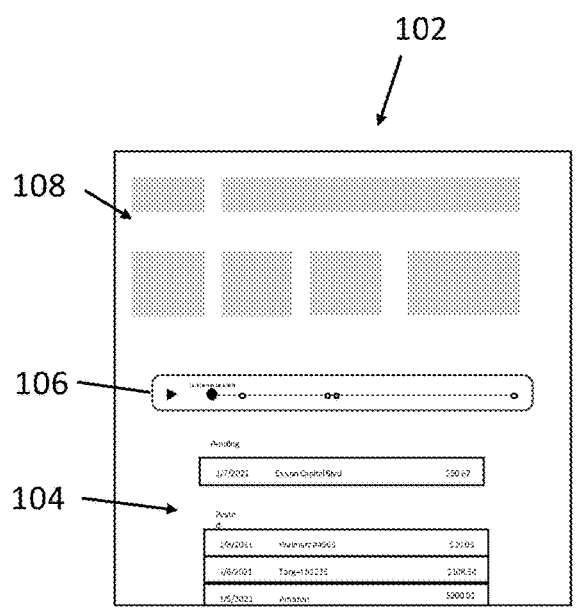
FIG. 1A
FIG. 1B

TECHNIQUES FOR GENERATING TRANSACTION FORECASTS

TECHNICAL FIELD

The present disclosure relates generally to providing a user with transaction information, and more particularly, but not exclusively, to providing a graphical user interface to forecast bank account transaction events in a serial manner.

BACKGROUND

Bank clients occasionally experience issues with predicting account balances in the future based on expected transactions. For example, it may be difficult for a client to visualize when an account may be in danger of overdrafting based on yet to occur, but predictable, account transactions in the future. Further, static transaction tables may not be able to tell the entire story. For example, the static transaction tables may not provide indications of when pending charges disappear or how and when the pending charges became posted transactions at a future date.

SUMMARY

In one example, a method for generating a transaction forecast is provided. The method includes accessing a forecast transaction template that defines forecast animation features of the transaction forecast. The method further includes predicting a set of recurring and expected charges at a client account and detecting a triggering event of transactions at the client account, wherein the triggering event is defined in the forecast transaction template. Additionally, the method includes identifying at least one additional transaction event relevant to the transaction forecast. Further, the method includes constructing a timeline of the set of expected charges, the at least one additional transaction event, and the triggering event and generating the transaction forecast including an animation of the additional transaction events, the set of expected charges, and the triggering event in the timeline.

In another example, a system may include a first computing device and a second computing device that communicates with the first computing device. The first computing device performs operations including accessing a forecast transaction template that defines forecast animation features of the transaction forecast. The operations also include predicting a set of recurring and expected charges at a client account and detecting a triggering event of transactions at the client account, wherein the triggering event is defined in the forecast transaction template. Additionally, the operations include identifying at least one additional transaction event relevant to the transaction forecast and constructing a timeline of the set of expected charges, the at least one additional transaction event, and the triggering event. Further, the operations include generating the transaction forecast including an animation of the additional transaction events, the set of expected charges, and the triggering event in the timeline.

In a further example, a non-transitory computer readable medium is described having stored therein instructions that are executable for performing operations. The operations include accessing a forecast transaction template that defines forecast animation features of the transaction forecast. The operations also include predicting a set of recurring and expected charges at a client account and detecting a triggering event of transactions at the client account, wherein the triggering event is defined in the forecast transaction template. Additionally, the operations include identifying at least one additional transaction event relevant to the transaction forecast and constructing a timeline of the set of expected charges, the at least one additional transaction event, and the triggering event. Further, the operations include generating the transaction forecast including an animation of the additional transaction events, the set of expected charges, and the triggering event in the timeline.

BRIEF DESCRIPTION OF THE DRAWINGS

FIGS. 1A and 1B are depictions of examples of transaction replay or forecast environments according to some examples of the present disclosure.

DETAILED DESCRIPTION

Figure 2A:
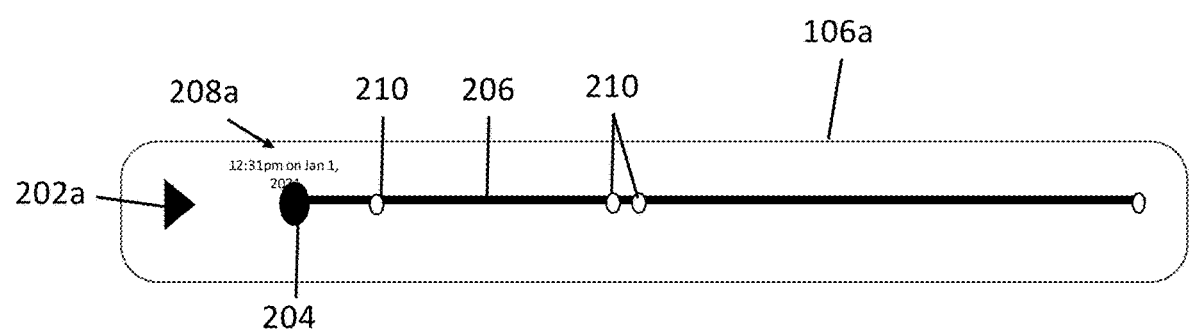
FIGS. 2A and 2B are depictions of examples of playback bars for a transaction replay or forecast environment according to some examples of the present disclosure.

Certain aspects and examples of the present disclosure relate to providing a graphical user interface to forecast bank account transaction events in a serial manner. A transaction event may be an event related to one or more transactions in a bank account. Examples can include receipt of a new transaction, modifications to transaction information (e.g., pending/posted status, amount, etc.), removal of a transaction, events corresponding to bank processing of transactions (e.g., final posted balance at end of day), and additional contextual help to show relating to certain events. The forecast of transaction events from a bank account may be generated based on criteria in a forecast transaction template which can be viewed in a variety of media. Once a template is specified, a process of identifying which transactions and information are relevant to the forecast may be performed, and a visual representation of the forecast, such as a letter, video, or interactive web interface, can be generated.

The forecast may be a fluid depiction of how predicted transaction information will be processed over time. Using the forecasts, clients may be able to understand predicted account balances and predicted fees more clearly. For example, a client can play a forecast animation that provides an indication of a predicted overdraft fee in the future based on current account balances and expected account transaction events. Additionally, the forecast enables clients to verify upcoming expenses.

The forecast of transaction events can provide clients with a visualization of an order of projected future transactions. For example, a client might receive a low future balance warning and want to know what upcoming transactions are taken into account and what the balance would be at each time step. For example, the forecast could show an insurance bill due in the next week, the income expected to be received the week after, and the mortgage payment due the week after that.

Using the techniques described herein, a client is able to visualize changes to an account balance over time in a forecast of future transactions. In this manner, the client may be able to view a chronological order of how transactions are posted and why certain events, such as an overdraft, may occur with the account. Further, a client is able to see exactly how pending charges are posted, canceled, or adjusted over time. This visualization may result in distinctive and successful client experiences that reduce call center complaints, improve client satisfaction, and save clients money by avoiding bank fees.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIGS. 1A and 1B are depictions of examples of transaction replay or forecast environments 100 and 102 according to some examples of the present disclosure. The transaction replay or forecast environments 100 and 102 may include graphical user interfaces displayed on screens of electronic devices accessed by clients of a bank. The clients may access the transaction replay or forecast environments 100 and 102 through an account page within a webpage environment of the bank, through a webpage link provided in an email to the client, through a mobile application, or through any other indicator provided to the client.

In an example, the transaction replay or forecast environment 100 includes a replay or forecast visualizer 104 and a playback bar 106 that are overlaid on an account page 108 for the client. In the transaction replay or forecast environment 102, the replay or forecast visualizer 104 and the playback bar 106 may be embedded within the account page 108 for the client. In either example, the replay or forecast visualizer 104 and the playback bar 106 may provide the client with a mechanism to view a replay or forecast of transaction events or a forecast of predicted transaction events over time. The replay or forecast may enable a user to better understand how transaction events impact account balances over time and in various stages (e.g., pending versus posted transaction events).

In some examples, the replays or forecasts may be triggered based on events occurring associated with a user account. Examples of an event that may trigger the replay can include unlocking a new bank benefit by a user. The bank benefit may be avoiding monthly maintenance fees, and the benefit may happen upon completing a certain number of transactions while maintaining a minimum balance. The replay may show a recap of the transactions and provide an indication of a specific transaction that unlocked the benefit. In an additional example, the event that triggers the replay may be a user requesting the replay to explain why a bank benefit was not unlocked. For example, when a user thinks that the benefit should have been unlocked, the user may engage frequently asked questions (FAQs) or live chat to find out why the bank benefit was not unlocked. The replay may show the user when a transaction occurred that resulted in a balance that fell below a minimum balance threshold at a certain point.

In an additional example, the triggering event may be an indication that a card associated with the account has been compromised. If the bank detects fraud, the replay can be used to show the fraud transactions happening interwoven with the user's personal transactions. Additionally, the bank may request that the user identify transactions shown in the replay as being fraudulent.

In some examples, a budget may be a triggering event. For example, if a user reaches a budget limit for a budget category, the replay display a recap of everything spent in the budget category to help the user reflect on what was purchased in the budget category. In some examples, the replay information may assist the user in establishing a plan to address transactions that exceed the budget limits for the budget categories. In some examples, a budget coach may trigger the replay to use the replay as a general reflection or forward planning tool as part of a financial review exercise.

In an additional example, a financial insight trigger may trigger the replay. For example, a financial insight provided by a bank about abnormally high spending or accounts approaching credit card limits may trigger the replay being provided to the user. The replay may enable the user to view the transactions that led to this high spending or approaching credit card limit and to see how the transactions impacted budget categories over time.

Figure 2B:
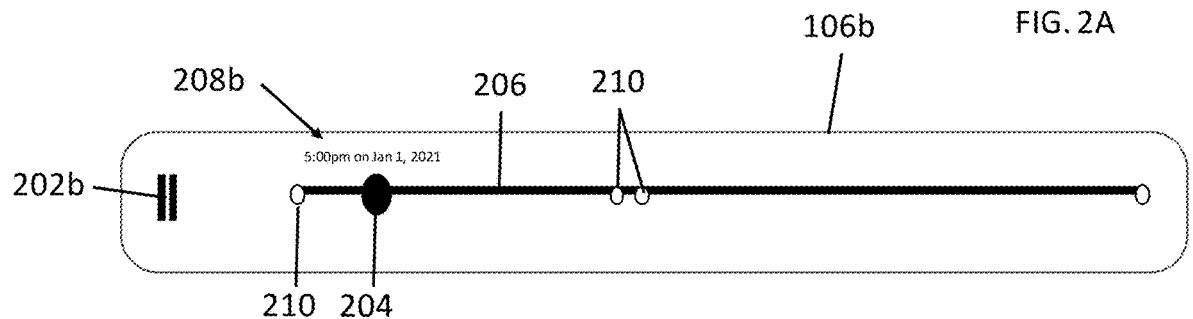

FIGS. 2A and 2B are depictions of examples of the playback bars 106 for the transaction replay or forecast environments 100 and 102 according to some examples of the present disclosure. The playback bar 106a may represent a view of the playback bar while a replay or forecast is paused. The playback bar 106b may represent a view of the playback bar with the replay or forecast is playing. In some examples, interacting with a play/pause toggle 202a may result in the replay or forecast entering a "play" mode. Similarly, interacting with a play/pause toggle 202b may revert the replay or forecast to a "paused" mode.

Also depicted is a manual control 204 for the playback bars 106a and 106b. Sliding the manual control 204 along a playback timeline 206 may result in advancing or reversing of the time position of the replay or forecast. In some examples current time positions 208a and 208b may be described based on the point in time represented by the replay or forecast of transaction events. Further, event indicators 210 may provide an indication of locations along the playback timeline 206 that represent transaction events that may impact the account. For example, the event indicators 210 may represent when a charge goes pending, when a charge is posted, or when an account receives a fee. Other events can also be represented by the event indicators 210.

Figure 3:
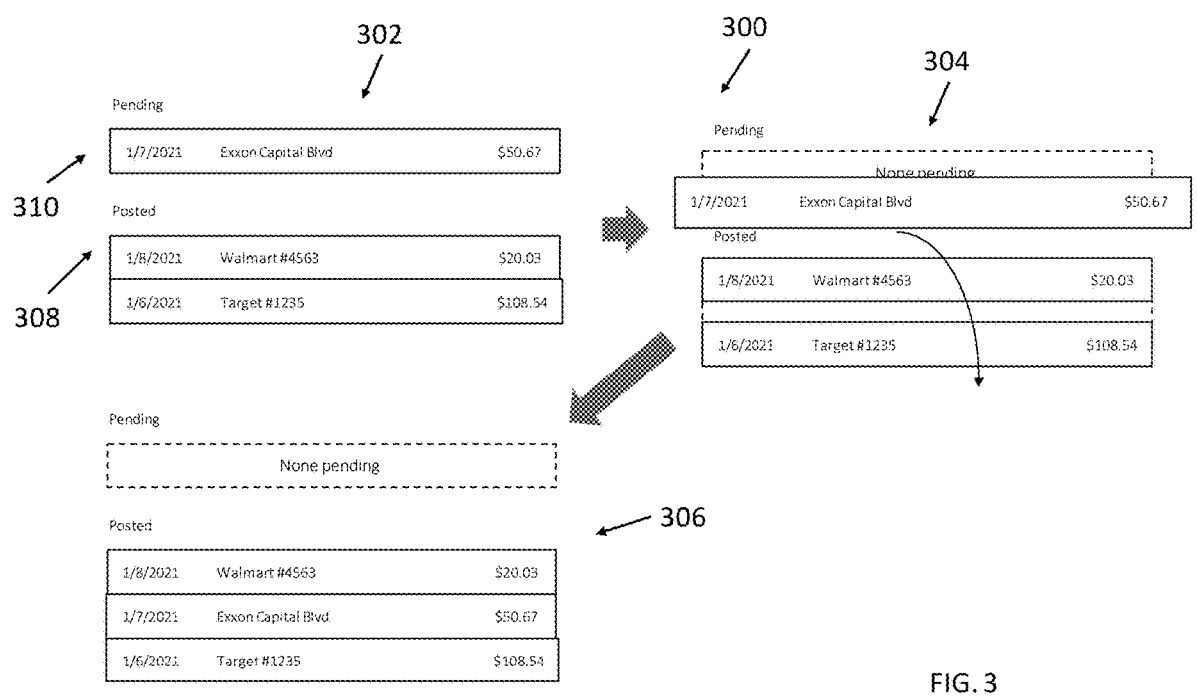
FIG. 3 is an example of a transaction replay or forecast animation according to some examples of the present disclosure.

FIG. 3 is an example of a transaction replay or forecast animation 300 according to some examples of the present disclosure. The transaction replay or forecast animation 300 may be depicted in the transaction replay or forecast environments 100 and 102 described above with respect to FIG. 1. Further, the transaction replay or forecast animation 300 may be controlled using the playback bar 106 described above with respect to FIGS. 1 and 2.

As illustrated, the transaction replay or forecast animation 300 includes a depiction of transaction events for a client account at three separate time stamps 302, 304, and 306. At time stamp 302, the transaction replay or forecast animation 300 depicts two posted charges 308 and one pending charge 310. The transaction replay or forecast animation 300 may provide a visual of how the pending charge 310 posts to the account to become one of the posted charges 308. For example, at time stamp 304, the transaction replay or forecast animation 300 begins moving the pending charge 310 to the posted charges 308. Further, at time stamp 306, the transaction replay or forecast animation 300 completes the process of moving the pending charge 310 to the posted charges 308.

In some examples, and as depicted in FIG. 3, the pending charge 310 may not be moved to the bottom or top of the posted charges 308. For example, the pending charge 310 may take longer to process and post than some other charges. Accordingly, the posted charge resulting from the pending charge 310 may be placed between other posted charges 308 based on when the transaction events actually occurred.

In additional examples, as the pending charge 310 transitions into the posted charges 308, the value of the transitioning event may also change. For example, a tip may be added to a pending restaurant charge. Additionally, a card hold for a higher amount at a gas station may be replaced by an actual purchase price of the gas as the pending charge 310 transitions to the posted charges 308.

Figure 4:
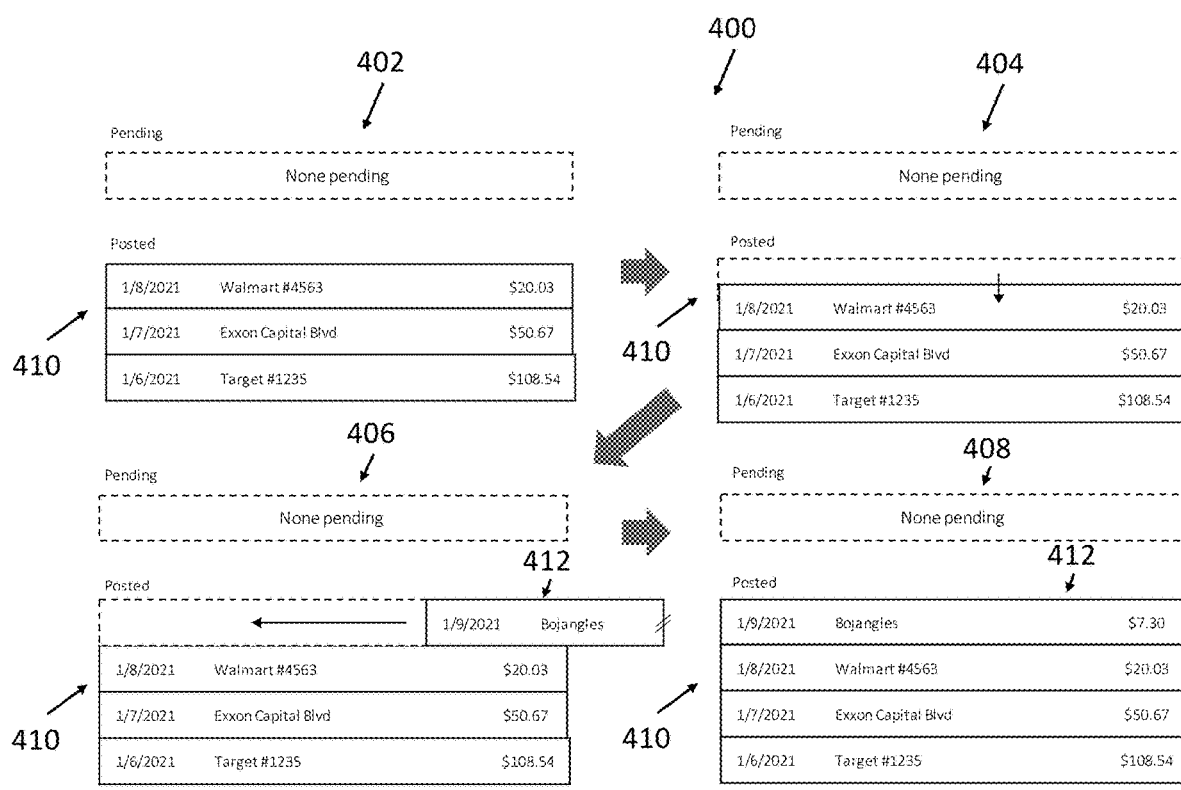
FIG. 4 is an additional example of a transaction replay or forecast animation according to some examples of the present disclosure.

FIG. 4 is an additional example of a transaction replay or forecast animation 400 according to some examples of the present disclosure. The transaction replay or forecast animation 400 may be depicted in the transaction replay or forecast environments 100 and 102 described above with respect to FIG. 1. Further, the transaction replay or forecast animation 400 may be controlled using the playback bar 106 described above with respect to FIGS. 1 and 2.

As illustrated, the transaction replay or forecast animation 400 includes a depiction of transaction events for a client account at three separate time stamps 402, 404, 406, and 408. At time stamp 402, the transaction replay or forecast animation 400 depicts three posted charges 410. The transaction replay or forecast animation 400 may provide a visual of how the an additional charge 412 posts to the account to become one of the posted charges 410. For example, at time stamp 404, the transaction replay or forecast animation 400 begins moving the posted charges 410 in a downward direction to make room for the additional charge 412. Further, at time stamp 406, the transaction replay or forecast animation 400 begins sliding the additional charge 412 into the posted charges 410. At time stamp 408, the transaction replay or forecast animation 400 completes the addition of the additional charge 412 to the posted charges 410.

Overdraft charges, or other bank fees, may be visualized in transaction replay or forecast animations in a manner similar to the transaction replay or forecast animation 400. For example, the bank fees may not initially appear as a pending charge and may instead be positioned within the posted charges 410. In some examples, the transaction replay or forecast animation 400 may also show a running account balance as the replay or forecast progresses. For example, as the transaction events post to the posted charges 410, the account balance may increase or decrease. If the account balance falls below zero with a transaction event to trigger an overdraft fee, the client may see exactly when and how that overdraft fee was triggered in the transaction replay or forecast animation 400.

Figure 5:
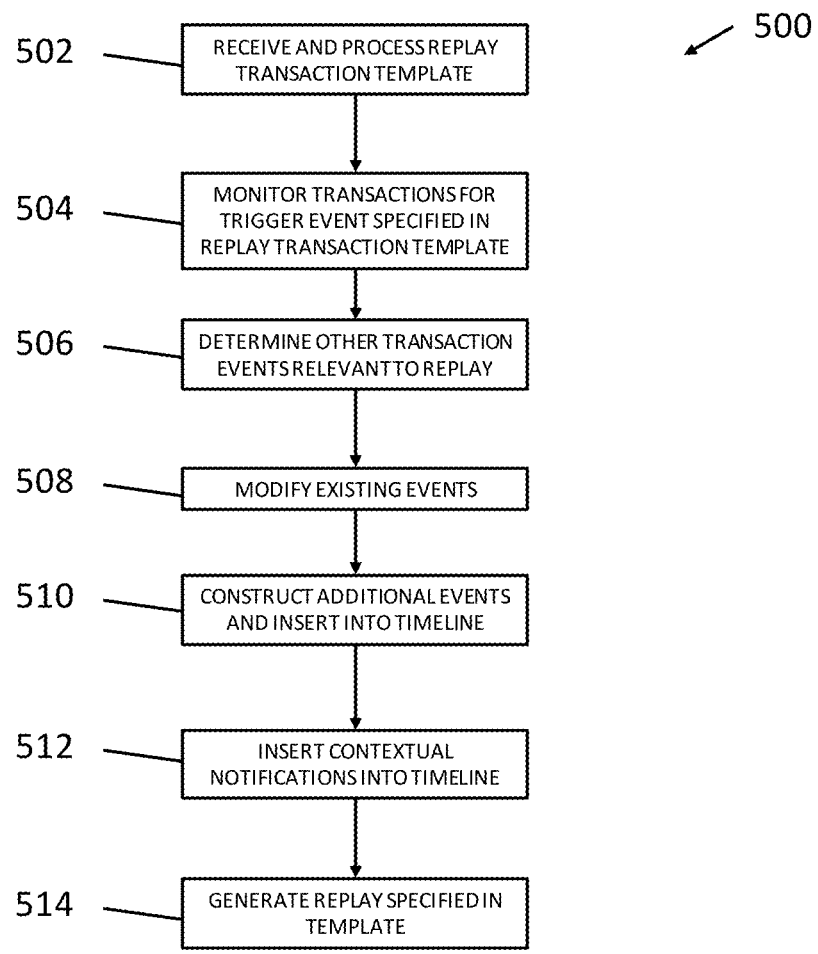
FIG. 5 is a flowchart of a process for generating a replay animation according to some examples of the present disclosure.

FIG. 5 is a flowchart of a process 500 for generating a replay animation according to some examples of the present disclosure. At block 502, the process 500 involves receiving and processing a replay transaction template. The replay transaction template may specify a variety of details that define when and how a replay animation is constructed. Details may include, but are not limited to, the criteria for determining an incident (e.g., an event that triggers generation of the replay, such as an overdraft), criteria for selecting transaction events related to an incident (e.g., transactions that may lead to the incident), steps to construct additional transaction events to add to the replay, whether active monitoring of transaction events should be initiated, whether a replay should be generated immediately, what happens after a replay is generated, etc. In some examples, the process 500 may begin generating a replay immediately upon receipt of the template, or the process 500 may initiate a subprocess that monitors for incidents that will trigger the replay.

At block 504, the process 500 involves monitoring transaction events for triggering events specified in the replay transaction template. The triggering events may include transactions that exceed a threshold value, overdraft fees, credit card fees, other bank fees, or any other transactions that may be of interest to the client associated with an account. In some examples, individual transaction events may be triggering events, or a combination of transaction events can be triggering events. For example, title similarities of transaction events, dates of transaction events, amounts of multiple transaction events, merchants associated with transaction events, locations of transaction events, etc. can all be used as triggering events to generate a replay animation.

At block 506, the process 500 involves determining other transaction events relevant to the replay animation. For example, the process 500 may identify which other pre-existing transaction events and information are relevant to the replay animation based on the template. In some examples, the template may specify that the replay animation should include all other transactions pending and posted that day. In such an example, all events for those transactions are included (e.g., a posted transactions may have been pending at one point so those pending events would be included).

Determining the other transaction events relevant to the replay animation may also involve identifying transaction information that is not included in a transaction table displayed to the user. For example, additional information may be used to make modifications to the transactions at subsequent blocks (e.g., at block 508). In such an example, an initial pending amount of a posted transaction may be obtained for inclusion in the replay as a transaction progression from the initial pending amount to the final posted amount already on display in the transaction table. In an additional example, date and time metadata may be obtained for when all transaction events relevant to the replay animation occur. Such information may help establish the timeline of transactions and events during the replay animation. For example, when transactions occur in time can be different from when they post because the order in which the bank processes transactions may be different from when they occur. In an additional example, the other transaction events relevant to the transaction replay may be transactions that are no longer shown in the transaction table. Such transactions may include transactions that were pending at one point and canceled before they posted so they no longer appear in the transaction table.

In some examples, the process 500 may leverage one or more machine-learning models to identify the other transaction events that are relevant to the replay animation. For example, a machine-learning model may be trained to receive a set of transaction information from a user account and identify the transactions that resulted in a triggering event or the transactions that are the most relevant to a lead-up to the triggering event. In this manner, the process 500 may consistently and efficiently identify any relevant transactions that should be included in the replay animation.

At block 508, the process 500 involves modifying existing transaction events that are relevant to the replay animation. For example, the posted transactions may be modified to show how those transactions impacted the account while they were still pending. In some examples, the pending charges may be larger or smaller than the posted charges for the same transaction event when accounting for tips and card holds.

In addition to adjusting transaction values from a pending state to a posted state, modifications of existing transactions in the replay animation can also include a transaction marked as canceled (e.g., putting a strikethrough on the text and not counting the amount toward the total). Additionally, a modification of a transaction can include contextual insights added to the transaction. For example, when financial insights establish triggers that are related to a specific transaction (e.g., detecting a duplicate transaction, detecting a subscription charge is higher than a previous month, etc.), then the insight to that transaction in the replay animation may be added so the user can see the insight when viewing the transaction in the transaction replay.

At block 510, the process 500 involves constructing additional events and inserting the additional events into the timeline of the replay animation. For example, events typically recorded in a transaction event log may not include bank processing events, such as an indication of an end of day posted balance, but the end of day posted balance may be added to the replay animation. The additional processing events may also include adding running balance calculations, adding qualification (or disqualification) for a bank benefit (e.g., avoiding monthly maintenance fees, bank tier level, etc.), adding information about budget amounts (e.g., total expenses in budget categories at the end of each day/week/month), adding a notice that the bank flagged a user account for fraud at a certain point, adding information about credit card limits at the end of each day/week/month (e.g., how much credit a user has remaining), adding insights to the replay (e.g., a cash flow summary at the end of the day/week/month), or any other relevant events. Such indications may provide a client with an opportunity to identify a particular transaction that led to a triggering event, such as an account overdraft that occurred when the end of day balance was posted for the account.

At block 512, the process 500 involves inserting contextual notifications into the timeline. The contextual notifications may include explanations in the replay animation about why a particular transaction event occurred, or why a transaction amount changed when moving from a pending charge to a posted charge. In some examples, the contextual notifications may include additional information not typically present in a transaction table. For example, if a user would like to see how budget category expenses are filled over the course of a statement period, the replay animation may show the changing totals in budget categories at each transaction of the replay animation. Such a contextual notifications may be beneficial when expenses cross over an end-of-month borderline that resets a budget category. Any other contextual notifications may also be inserted into the timeline to provide the client with context regarding various transactions displayed in the replay animation.

At block 514, the process 500 involves generating the replay animation specified by the template. Upon collecting the data identified by the template in the blocks above, the actual replay animation that visualizes the data may be generated. In an example, the replay animation can be presented using a variety of media. For example, the replay animation may be generated in a letter, as a video, through a mobile application, or through an interactive web interface. In an example, the replay animation may be rendered by a user device of the client for display in a graphical user interface of the user device.

An initiator (e.g., a link, button, etc.) to a web page or mobile application that initiates a viewing mode may be provided to the client in some examples. The viewing mode may begin with a blank area and incrementally display transaction information based on the order of occurrence of the corresponding transaction events. The viewing mode may include controls, such as those described above with respect to FIGS. 2A and 2B, to enable manipulation of the replay. The viewing mode may also enable the user to interact with the transactions themselves at any point in the replay to get information at a particular point in time, such as whether a transaction is pending at the point in time.

In some examples, the initiator may be sent to a user through an email, an SMS message, or through any other communication medium (e.g., a QR code in a letter). In additional examples, the replay animation may be sent to the client as a video file for review. In some examples, the client may be able to interact with a dynamic link within a transaction table of an account view, and the replay animation may be sent or otherwise provided to the client in response to interacting with the dynamic link. Additionally, if specified by the replay transaction template, information about the replay animation may be stored at the bank such that the bank and the client are able to access the replay animation at a later date.

In some examples, the replay animation may also be provided to another entity if specified by the template. For example, the replay animation may be sent to a financial advisor of the client if there is a transaction event that is relevant to the services provided by the financial advisor. Other entities may also receive notifications of transaction events that are displayed in the replay animation.

Figure 6:
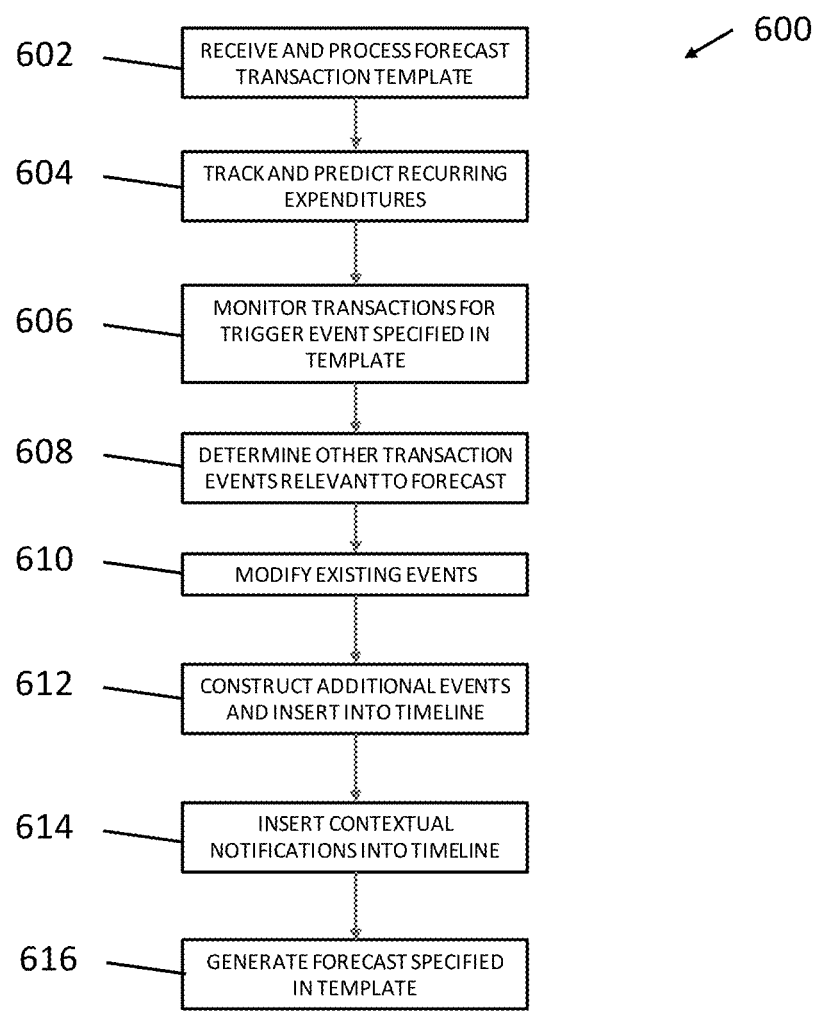
FIG. 6 is a flowchart of a process for generating a forecast animation according to some examples of the present disclosure.

FIG. 6 is a flowchart of a process 600 for generating a forecast animation according to some examples of the present disclosure. At block 602, the process 600 involves receiving and processing a forecast transaction template. The forecast transaction template may specify a variety of details that define when and how a forecast animation is constructed. Details may include, but are not limited to, the criteria for determining a predicted incident (e.g., a predicted event at a future time that triggers generation of the forecast, such as an overdraft), criteria for selecting transaction events related to an incident (e.g., transactions that may lead to the incident), steps to construct additional transaction events to add to the forecast, whether active monitoring of transaction events should be initiated, whether a forecast should be generated immediately, what happens after a forecast is generated, etc. In some examples, the process 600 may begin generating a forecast immediately upon receipt of the template, or the process 600 may initiate a subprocess that monitors for incidents that will trigger the forecast.

At block 604, the process 600 involves tracking and predicting recurring expenditures. To effectively forecast future transaction events of a client account, a comprehensive understanding of client expenditure trends may be beneficial. For example, the process 600 may involve tracking, over time, charges that occur on a regular basis. In some examples, the charges may be loan payments or subscriptions the post on the same day every month. In additional examples, the charges may include any other regular expenses with predictable values.

In some examples, the process 600 may involve using one or more machine-learning models to predict future expenses.

The machine-learning models may be trained to receive an account transaction history of a client and identify recurring credits (e.g., paychecks) or charges (e.g., loan payments and subscriptions) that will always occur for a similar amount on or around a particular day of a month. Additionally, the machine-learning models may be trained to predict expected expenses for transactions that will occur, but not necessarily on the same day every month and not necessarily for the same amount every month. For example, the machine-learning models may identify that a client goes grocery shopping at a regular interval (e.g., every 5 days) and spends an average amount of money for every grocery shopping trip (e.g., $150). By predicting recurring expenses and expected expenses, the process 600 may be able to accurately forecast expected account balances at future dates.

At block 606, the process 600 involves monitoring transaction events for triggering events specified in the forecast transaction template. The triggering events may include transactions that exceed a threshold value, unexpected transactions, an indication of an expected overdraft at a future date, credit card fees, other bank fees, or any other transactions that may be of interest to the client associated with an account. In some examples, individual transaction events may be triggering events or a combination of transaction events can be triggering events. For example, title similarities of transaction events, dates of transaction events, amounts of multiple transaction events, merchants associated with transaction events, locations of transaction events, etc. can all be used as triggering events to generate a forecast animation. In an example, an expected overdraft at a future data may be determined based on predicted credits or charges in the account over a future period of time. For example, if the current account balance less expected charges and plus expected credits over the period of time is negative, then an indication of the expected overdraft may be generated to trigger a forecast.

At block 608, the process 600 involves determining other transaction events relevant to the forecast animation. For example, the process 600 may identify which other pre-existing transaction events, predicted future transaction events, and other information are relevant to the forecast animation based on the template. In some examples, the template may specify that the forecast animation should include all other transactions pending and posted that day and any expected transactions leading up to the forecasted event. In such an example, all events for those transactions are included (e.g., a posted transactions may have been pending at one point so those pending events would be included).

Determining the other transaction events relevant to the forecast animation may also involve identifying transaction information about forecasted transactions that may not be included in a transaction table displayed to the user. For example, additional information may be used to make modifications to the transactions at subsequent blocks (e.g., at block 610). In such an example, an initial pending amount of a posted transaction may be forecast for inclusion in the forecast animation as the pending transaction progresses to a posted transaction that may ultimately be posted on the transaction table. In an additional example, date and time metadata may be obtained for when forecast transaction events relevant to the forecast animation may occur. Such information may help establish the timeline of transactions and events during the forecast animation.

In some examples, the process 600 may leverage one or more additional machine-learning models to identify the other transaction events that are relevant to the forecast animation. For example, a machine-learning model may be trained to receive a set of transaction information from a user account and identify the transactions that are expected to contribute to the triggering event or the transactions that are the most relevant to a lead-up to the triggering event. In this manner, the process 600 may consistently and efficiently identify any relevant transactions that should be included in the forecast animation.

At block 610, the process 600 involves modifying existing transaction events that are relevant to the forecast animation. For example, the posted transactions may be modified to show how those transactions impacted the account while they were still pending. In some examples, the pending charges may be larger or smaller than the posted charges for the same transaction event when accounting for tips and card holds. Additionally, currently pending charges may be modified to show an estimation of when the pending charges will post and whether and how the charge will change when it does post (e.g., either by adding a tip or by adjusting down a card hold amount).

At block 612, the process 600 involves constructing additional transaction events and inserting the transaction events into the timeline of the forecast animation. In an example, the additional transaction events may be events that have already occurred or events that are predicted. Events recorded in a transaction event log may not include bank processing events, such as an indication of an end of day posted balance, but the end of day posted balance may be added to the forecast animation. The additional processing events may also include adding running balance calculations, adding qualification (or disqualification) for a bank benefit (e.g., avoiding monthly maintenance fees, bank tier level, etc.), adding information about budget amounts (e.g., total expenses in budget categories at the end of each day/week/month), adding information about credit card limits at the end of each day/week/month (e.g., how much credit a user has remaining), adding insights to the replay (e.g., a cash flow summary at the end of the day/week/month), or any other relevant events. Further, the predicted transactions identified at block 604 may be added to the timeline. Such an indication may provide a client with an opportunity to identify a particular transaction that led to a triggering event, such as an account overdraft that is expected to occur when the end of day balance is posted for the account.

At block 614, the process 600 involves inserting contextual notifications into the timeline. The contextual notifications may include explanations in the forecast animation about why a particular transaction event occurred, why a transaction amount changed when moving from a pending charge to a posted charge, or information associated with why a future predicted or expected transaction is on the timeline. In some examples, the contextual notifications may include additional information not typically present in a transaction table. For example, if a user would like to see how budget category expenses are predicted to be filled over the course of a future statement period, the forecast animation may show the changing totals in budget categories at each predicted transaction. Any other contextual notifications may also be inserted into the timeline to provide the client with context regarding various transactions displayed in the forecast animation.

At block 616, the process 600 involves generating the forecast animation specified by the template. Upon collecting the data identified by the template in the blocks above, the actual forecast animation that visualizes the data may be generated. In an example, the forecast animation can be presented using a variety of media. For example, the forecast animation may be generated in a letter, as a video, through a mobile application, or through an interactive web interface. In an example, the forecast animation may be rendered by a user device of the client for display in a graphical user interface of the user device.

An initiator (e.g., a link, button, etc.) to a web page or mobile application that initiates a viewing mode may be provided to the client in some examples. The viewing mode may begin with a blank area and incrementally display transaction information based on the order of occurrence of the corresponding transaction events. The viewing mode may include controls, such as those described above with respect to FIGS. 2A and 2B, to enable manipulation of the forecast. The viewing mode may also enable the user to interact with the transactions themselves at any point in the forecast to get information at a particular point in time, such as whether a transaction is pending at the point in time or how a predicted transaction was generated.

In some examples, the initiator may be sent to a user through an email, an SMS message, or through any other communication medium (e.g., a QR code in a letter). In additional examples, the forecast animation may be sent to the client as a video file for review. In some examples, the client may be able to interact with a dynamic link within a transaction table of an account view, and the forecast animation may be sent or otherwise provided to the client in response to interacting with the dynamic link. Additionally, if specified by the forecast transaction template, information about the forecast animation may be stored at the bank such that the bank and the client are able to access the forecast animation at a later date.

In some examples, the forecast animation may also be provided to another entity if specified by the template. For example, the forecast animation may be sent to a financial advisor of the client if there is a transaction event that is relevant to the services provided by the financial advisor. Other entities may also receive notifications of transaction events that are displayed in the forecast animation.

In some examples, the processes 500 and 600 may be combined to generate a combined replay and forecast animation. In such an example, the combined replay and forecast animation may animate transaction events from a previous month and predicted transaction events for a future month. Other time frames may also be used to generate the combined replay and forecast animation.

Figure 7:
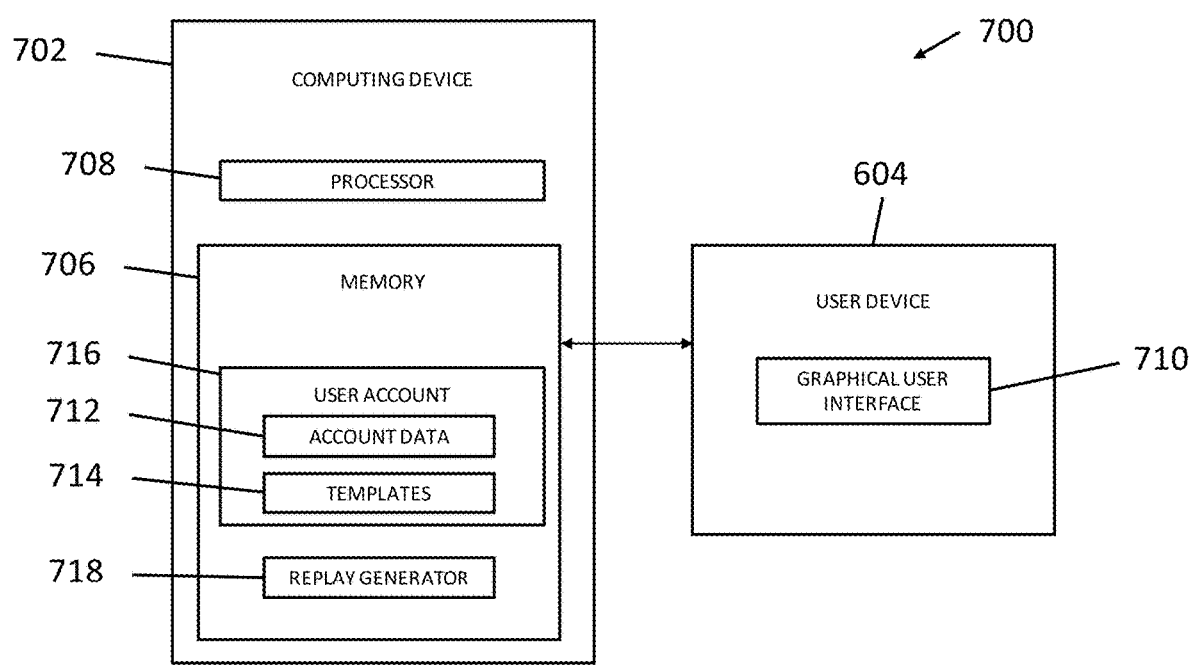
FIG. 7 is an example of a computing environment according to some examples of the present disclosure.

FIG. 7 is an example of a computing environment 700 according to some examples of the present disclosure. The computing environment 700 can include a computing device 702 that can be coupled to a user device 704. The computing device 702 can be the same as or different from the user device 704, and can include a server, such as a cloud computing server. The computing device 702 can be coupled to the user device 704 over a network, such as the Internet. Additionally or alternatively, the computing device 702 can be coupled to the user device 704 via a physical connection or local area network. The computing device 702 can include a memory 706 that can be a non-transitory computer-readable medium. The memory 706 can store instructions that can be executed by a processor in the computing device 702. The computing device 702 can include a processor 708 that can be communicatively coupled to the memory 706. The memory 706 can include instructions that can be executable by the processor 708 for causing the processor 708 to perform operations.

The processor 708 can include one processor or multiple processors. Non-limiting examples of the processor 708 include a Field-Programmable Gate Array (FPGA), an application-specific integrated circuit (ASIC), a microprocessor, etc. The processor 708 can execute instructions stored in the memory 706 to perform one or more operations. In some examples, the instructions can include processor-specific instructions generated by a compiler or an interpreter from code written in any suitable computer-programming language, such as C, C++, C#, etc.

For example, the processor 708 can receive a request from a user device 704 to generate and provide a transaction replay or forecast animation for display on a graphical user interface 710 of the user device 704. For example, the processor 708 can access account data 712 and replay or forecast templates 714 from user account data 716 stored in the memory 706. The processor 708 can execute a replay generator 718 stored in the memory 706 to generate the transaction replay or forecast animations. In some examples, the processor 708 can transmit a push notification to the user device 704 with an indication that a replay or forecast was automatically generated based on a trigger event identified by the templates 714. For example, the processor 708 can push the notification when an overdraft fee triggers generation of the replay or forecast. Any additional operations discussed above with respect to FIGS. 1-6 may be performed by the computing device 702, the user device 704, or a combination thereof.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computer-implemented method for generating a graphical user interface, the computer-implemented method comprising:

accessing, by at least one processing device, a forecast transaction template that defines a triggering event and at least one additional transaction event;

detecting, by the at least one processing device, the triggering event occurring with respect to a client account, wherein the triggering event comprises an overdraft fee associated with the client account;

in response to detecting the triggering event:
determining a set of transaction events by:
predicting, by the at least one processing device, a set of expected charges at the client account; and
identifying, by the at least one processing device, the at least one additional transaction event relevant to the transaction forecast template, the at least one additional transaction event comprising a pending transaction transitioning to a posted transaction; and
constructing, by the at least one processing device, a timeline of the set of transaction events and the triggering event;
generating the graphical user interface, wherein the graphical user interface comprises:
a playback bar comprising a toggle, a first event indicator representing the pending transaction, and a second event indicator representing the posted transaction; and
a forecast visualizer, wherein the playback bar and the forecast visualizer are overlaid on an account page associated with the client account, wherein the account page is within a webpage or a mobile application, wherein the forecast visualizer comprises an animation of the set of transaction events based on the timeline, wherein the animation comprises a pending section and a posted section, and wherein the toggle is selectable by a user to control the animation; and
    outputting, by the at least one processing device, the graphical user interface at a client device, wherein the outputting the graphical user interface comprises:
        outputting the animation in a first configuration that shows the set of transaction events prior to the triggering event, wherein the pending transaction is in the pending section in the first configuration; and
        automatically rearranging the set of transaction events to output the animation in a second configuration that shows the set of transaction events after the triggering event, wherein the automatic rearranging of the set of transaction events comprises moving the pending transaction from the pending section to the posted section to show the transition of the pending transaction to the posted transaction.

2. The computer-implemented method of claim 1, wherein predicting the set of expected charges comprises applying a machine-learning model to a set of historical charges at the client account to generate the set of expected charges.

3. The computer-implemented method of claim 1, further comprising:
    determining a modified transaction event of the at least one additional transaction event, wherein the modified transaction event was modified from an original transaction event; and
    adding a transition from the original transaction event to the modified transaction event to the timeline.

4. The computer-implemented method of claim 3, wherein the transition from the original transaction event to the modified transaction event comprises the pending transaction transitioning to the posted transaction.

5. The computer-implemented method of claim 1, further comprising:
    identifying additional processing events and contextual notifications, wherein the timeline comprises the additional processing events and the contextual notifications.

6. The computer-implemented method of claim 5, wherein the additional processing events comprise a predicted end of day posted account balance, and wherein a second triggering event defined by the transaction forecast template comprises a negative value of the predicted end of day posted account balance.

7. A system, comprising:
    a first computing device; and
    a second computing device configured to communicate with the first computing device;
    the first computing device configured to perform operations including:
        accessing a forecast transaction template that defines a triggering event and at least one additional transaction event;
        detecting the triggering event occurring with respect to a client account, wherein the triggering event comprises an overdraft fee associated with the client account;
        in response to detecting the triggering event:
            determining a set of transaction events by:
                predicting a set of expected charges at the client account; and
                identifying the at least one additional transaction event relevant to a transaction forecast template, the at least one additional transaction event comprising a pending transaction transitioning to a posted transaction;
        constructing a timeline of the set of transaction events and the triggering event;
        generating a graphical user interface, wherein the graphical user interface comprises:
            a playback bar comprising a toggle, a first event indicator representing the pending transaction, and a second event indicator representing the posted transaction; and
            a forecast visualizer, wherein the playback bar and the forecast visualizer are overlaid on an account page associated with the client account, wherein the account page is within a webpage or a mobile application, wherein the forecast visualizer comprises an animation of the set of transaction events based on the timeline, wherein the animation comprises a pending section and a posted section, and wherein the toggle is selectable by a user to control the animation; and
        outputting the graphical user interface at a client device, wherein the outputting the graphical user interface comprises:
            outputting the animation in a first configuration that shows the set of transaction events prior to the triggering event, wherein the pending transaction is in the pending section in the first configuration; and
            automatically rearranging the set of transaction events to output the animation in a second configuration that shows the set of transaction events after the triggering event, wherein the automatic rearranging of the set of transaction events comprises moving the pending transaction from the pending section to the posted section to show the transition of the pending transaction to the posted transaction.

8. The system of claim 7, wherein the second computing device is configured to perform operations comprising:
    rendering the graphical user interface at the second computing device.

9. The system of claim 7, wherein the first computing device is further configured to perform operations comprising:
    determining a modified transaction event of the at least one additional transaction event, wherein the modified transaction event was modified from an original transaction event; and
    adding a transition from the original transaction event to the modified transaction event to the timeline.

10. The system of claim 9, wherein the transition from the original transaction event to the modified transaction event comprises the pending transaction transitioning to the posted transaction.

11. The system of claim 7, wherein the first computing device is further configured to perform operations comprising:
    identifying additional processing events and contextual notifications, wherein the timeline comprises the additional processing events and the contextual notifications.

12. The system of claim 11, wherein the additional processing events comprise a predicted end of day posted account balance, and wherein a second triggering event defined by the transaction forecast template comprises a negative value of the predicted end of day posted account balance.

13. A non-transitory computer readable medium having stored therein instructions that are executable by a processing device for causing the processing device to perform operations including:
accessing a forecast transaction template that defines a triggering event and at least one additional transaction event;
detecting the triggering event occurring with respect to a client account, wherein the triggering event comprises an overdraft fee associated with the client account;
in response to detecting the triggering event:
determining a set of transaction events by:
predicting a set of expected charges at the client account; and
identifying the at least one additional transaction event relevant to the transaction forecast template, the at least one additional transaction event comprising a pending transaction transitioning to a posted transaction;
constructing a timeline of the set of transaction events and the triggering event;
generating a graphical user interface, wherein the graphical user interface comprises:
a playback bar comprising a toggle, a first event indicator representing the pending transaction, and a second event indicator representing the posted transaction; and
a forecast visualizer, wherein the playback bar and the forecast visualizer are overlaid on an account page associated with the client account, wherein the account page is within a webpage or a mobile application, wherein the forecast visualizer comprises an animation of the set of transaction events based on the timeline, wherein the animation comprises a pending section and a posted section, and wherein the toggle is selectable by a user to control the animation; and
outputting the graphical user interface at a client device, wherein the outputting the graphical user interface comprises:
outputting the animation in a first configuration that shows the set of transaction events prior to the triggering event, wherein the pending transaction is in the pending section in the first configuration; and
automatically rearranging the set of transaction events to output the animation in a second configuration that shows the set of transaction events after the triggering event, wherein the automatic rearranging of the set of transaction events comprises moving the pending transaction from the pending section to the posted section to show the transition of the pending transaction to the posted transaction.

14. The non-transitory computer readable medium as defined in claim 13, further comprising instructions for performing operations including:
determining a modified transaction event of the at least one additional transaction event, wherein the modified transaction event was modified from an original transaction event; and
adding a transition from the original transaction event to the modified transaction event to the timeline.

15. The non-transitory computer readable medium as defined in claim 14, wherein the transition from the original transaction event to the modified transaction event comprises the pending transaction transitioning to the posseted transaction.

16. The non-transitory computer readable medium as defined in claim 15, wherein the pending transaction transitioning to the posted transaction comprises a change in a value of the original transaction event.

17. The non-transitory computer readable medium as defined in claim 13, wherein predicting the set of expected charges comprises applying a machine-learning model to a set of historical charges at the client account to generated the set of expected charges.

* * * * *